United States Patent [19]

Quintana

[11] Patent Number: 4,667,087
[45] Date of Patent: May 19, 1987

[54] SECURE CREDIT CARD

[75] Inventor: Max A. Quintana, 4882 Tucson St., Denver, Colo. 80239

[73] Assignees: Max A. Quintana, Denver, Colo.; Robert E. King; Bernard L. Morgan; Alton Y. Lennon, all of Wilmington, N.C.

[21] Appl. No.: 846,214

[22] Filed: Mar. 31, 1986

[51] Int. Cl.$^4$ .............................................. G06K 5/00
[52] U.S. Cl. ..................... 235/380; 235/379; 235/382
[58] Field of Search ................ 235/379, 380, 382, 381

[56] References Cited

U.S. PATENT DOCUMENTS 4,614,861  9/1986  Paulou ................. 235/380

Primary Examiner—Harold I. Pitts
Attorney, Agent, or Firm—Dowell & Dowell

[57] ABSTRACT

A credit card resistant to unlawful use has a code, indicative of the owner's account number hidden beneath an opaque shield. The card has a keyboard and microprocessing components electrically connected to the shield. Insertion of correct entries, e.g. an owner's personal identification number, into the keyboard results in application of an electric signal to the shield to render it transparent in order that the code may be viewed by another person or by a machine. Erroneous attempts to operate the keyboard beyond a predetermined standard disable the keyboard from further operation.

17 Claims, 9 Drawing Figures

SECURE CREDIT CARD

BACKGROUND OF THE INVENTION

1. Field of the Invention

This invention relates to a portable identification transaction device such as a credit card, generally of thin relatively rigid plastic material, of a type which is carried by the public to enable it to make transactions, usually in a retail establishment, without the necessity of using cash.

2. Description of the Prior Art

Credit cards in current use ordinarily have printed thereon the name of the issuing financial establishment. In addition, the name of the user and his account number and the expiration date of the card are provided in raised type in order that the card may be placed in a device and the data imprinted. The card also commonly carries a magnetic strip which is readable by the device and identifies the user of the card.

Such credit cards are frequently stolen or unlawfully manufactured resulting in an unauthorized user being able to make purchases against the account of the card holder.

Another type of card in the prior art is that used in electronic funds transfer systems. These are inserted into a terminal machine located at the premises of a financial institution or other merchant. The user, by inserting his personal identification number (PIN) into the machine, can activate it and make deposits or withdraw cash from his account, or perform other transactions.

The Chaum U.S. Pat. No. 4,529,870, discloses a cryptographic device having a keyboard and which is useable with an external system in order to provide identification of the user and prevent unlawful use.

The Boutaleb et al. U.S. Pat. No. 4,536,014 discloses a credit card device having a liquid crystal mask covering an identity element. The mask can be changed to transparent form by inserting it between electrodes in a terminal machine.

The Weinberger U.S. Pat. No. 4,472,627, discloses a liquid crystal display in currency.

The Richard U.S. Pat. No. 3,624,938, and Jaffe U.S. Pat. No. 3,399,473, disclose credit cards having rotatable dials which, when set in predetermined positions, complete electric circuits.

The Benton U.S. Pat. No. 4,523,087, discloses a two-part portable verification device including a keyboard with a readout thereon, and a card which is insertable into the keyboard. The keyboard device is inserted into an external system which can optically read the readout from the keyboard device. The readout is not visible to the customer in order that he may not be aware of the data being transmitted between the keyboard device and the external device.

The Stuckert U.S. Pat. No. 4,277,837, discloses a personal portable terminal for financial transactions which is useable with external systems.

SUMMARY OF THE INVENTION

It is an object of the invention to provide a credit card of generally similar physical size to those commonly in use and which may be used in retail transactions in the way that credit cards ordinarily are used, or may be machine read, but in which the account number of the user is masked or hidden from view until the card holder's personal identification number (PIN) is inserted into an onboard keyboard within a predetermined number of tries.

It is a further object of the invention to provide a credit card device in which the code or account number of the authorized user is shielded from view until appropriate operation of an onboard keyboard occurs. Incorrect operation of the keyboard beyond a predetermined standard disables the keyboard from further use.

The customer's account number may be in machine readable form such as a bar code or machine readable symbols if desired or may simply be in conventional form. Thus, the card may be used with an external machine which reads the customer's account number in order that further transactions may occur or it may be simply read by a retail clerk.

DESCRIPTION OF THE PREFERRED EMBODIMENT

Figure 1:
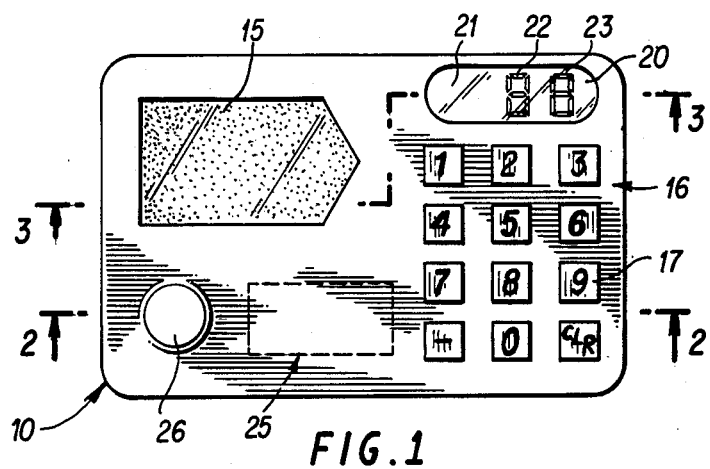
FIG. 1 is a plan view of a credit card in accordance with the present invention.
Figure 2:
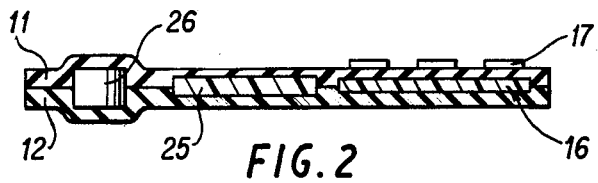
FIGS. 2 and 3 are sections to an enlarged scale on the lines 2—2 and 3—3 of FIG. 1.
Figure 8:
FIG. 8 is a plan view of a typical code display.
Figure 3:
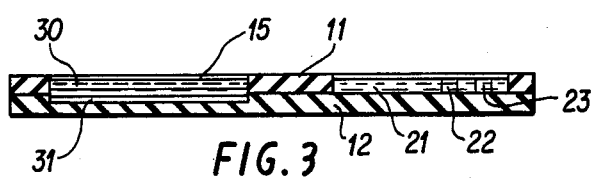

With further reference to the drawings, a credit card 10 is illustrated having upper and lower sheets 11 and 12 which may be formed of semi-rigid plastic of the kind that is commonly used in credit cards.

The card has a code display window 15, a keyboard 16 with individual keys 17 etc., a liquid crystal display window 20, having individual displays 21, 22, and 23 processing circuitry 25, and a battery or other suitable source of power 26.

The display window 15, formed in the upper surface of the sheet 11, is of transparent material and overlies a shutter or mask 30 of a liquid crystal device which will be described in detail later. Immediately beneath the mask 30 is a film 31 on which appears a code such as a UPC or other machine readable code indicative of the user's account number. For improved visibility, the code is preferably black, the film, white. Such code is normally blocked from view by the mask 30 but may be viewed by the mask becoming transparent.

The keyboard 16 is of the conventional telephone type, the keys 17 ordinarily having membrane type switches which are commonly used on hand-held calculators. The keyboard is carried between the upper and lower sheets 11 and 12.

The liquid crystal displays 21, 22, and 23 are of the nematic type which are in common use. These may be either numeric or alpha numeric displays.

The processing system 25 includes a microprocessor and associated components and the electrical connections therebetween for carrying out the functions which will presently be described. Electrical connections are of conventional flat ribbon cable, the cable being carried between the upper and lower plastic sheets 11 and 12.

While the details of the manufacture and assembly of the components of the card may vary, it is contemplated that the sheets 1 and 2 will be bonded to each other by lamination or secure adhesive except where they overly components which are interposed therebetween in which case the sheets will be bonded to the components themselves and the components to each other. This is of particular utility in connection with the mask 30 and the code display 31 which are preferably bonded together to prevent the unauthorized removal of the mask from the code display in order to uncover the code.

Figure 5:
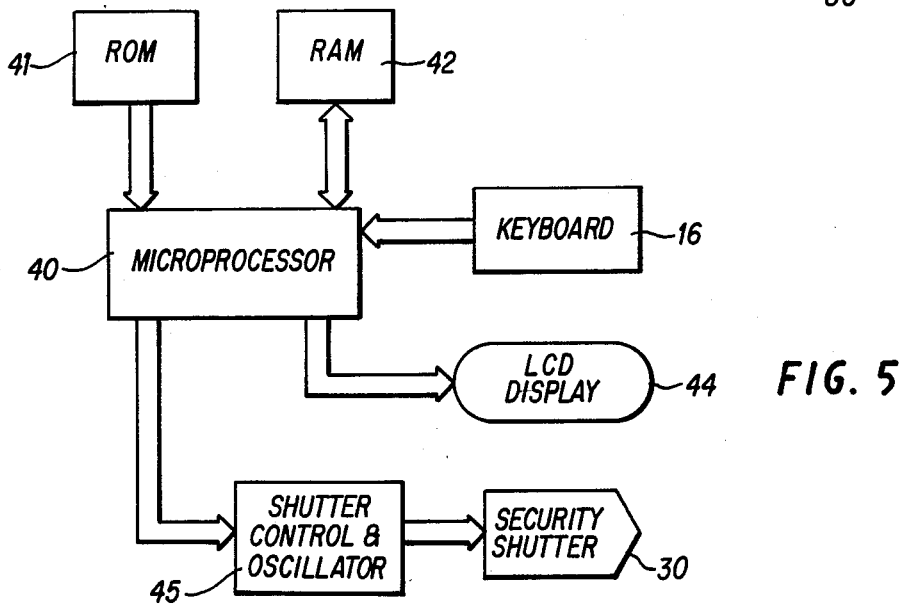
FIG. 5 is a block diagram illustrating the microprocessor and associated processing components carried by the card.

FIG. 5 illustrates a block diagram of the processing system. This includes a microprocessor 40, a read-only memory (ROM) 41, a random access memory (RAM) 42, the keyboard 16, the LCD display group 44 (displays 21, 22 and 23), a shutter control and oscillator 45, and the security shutter or mask 30.

The microprocessor 40 may be any eight or sixteen bit processor that has minimal power consumption and uses only one power supply. An example is NSC 800 manufactured by National Semiconductor Corporation. The ROM 41 and RAM 42 are of conventional nature and readily available on the market. The operation software program, including the customer's stored PIN, resides in the ROM 41, the working memory in RAM 42.

An example of a mask structure 30 is that disclosed in Fergason U.S. Pat. No. 4,435,047. This patent describes the manufacture of nematic liquid crystal devices in which the material is changed from black to nearly clear transparent upon the application of an electric field. See especially column 17, lines 28-32. It is contemplated that the device to which the electric field is applied, would be of a size and shape to provide the mask or security shutter in the present application over the code display 31. Upon the application of a suitable electric field, the mask would change from black to transparent. Since the mask is opaque in the absence of an electric field, in the event of a failure of power, the mask would continue to block any viewing of the customer's account number.

Reference is made to the schematic diagrams 6a and 6b in which conventional symbols are employed.

Figure 6A:
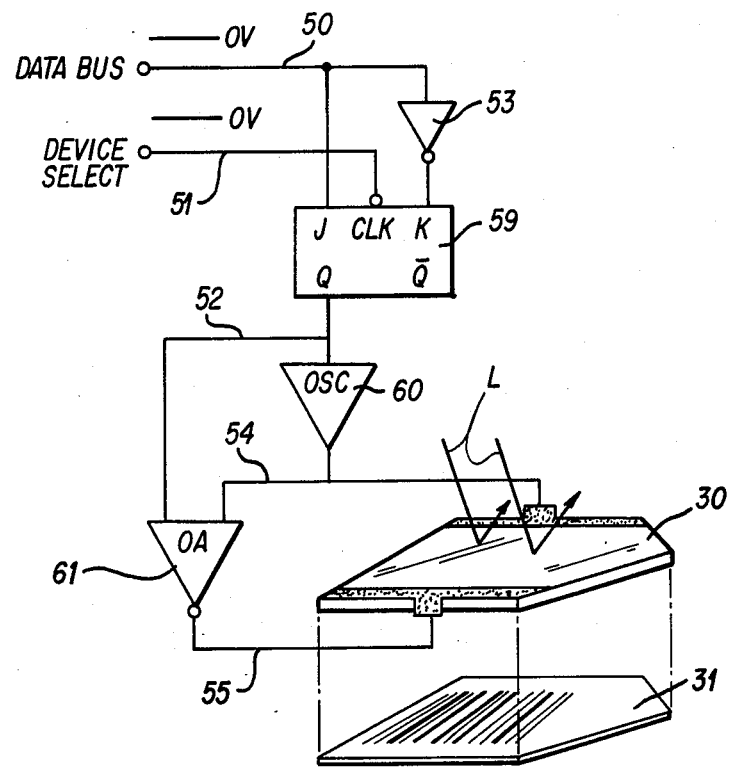
FIGS. 6a and 6b are schematics of one embodiment of the circuitry for operating the shutter covering the customer's code.

In FIG. 6a, the shutter 30 is in the opaque mode of operation. Light L striking the surface is not transmitted. During this mode there is no device select strobe 51 and as a result the contents of the computer data bus 50 cannot be loaded through inverter 53 into the device select register 59 and is therefore in the reset mode. In this condition, the ouput 52 of the set side (Q) of the register 59 is zero volts (0), disabling the oscillator 60, and also disabling the operational amplifier inverter 61 (OA). The outputs of 54 and 55 the oscillator 60 and the operational amplifier 61 under this condition are at zero volts, thus meeting the voltage requirements at the electrodes of the shutter 30 to maintain an opaque state.

Figure 6B:
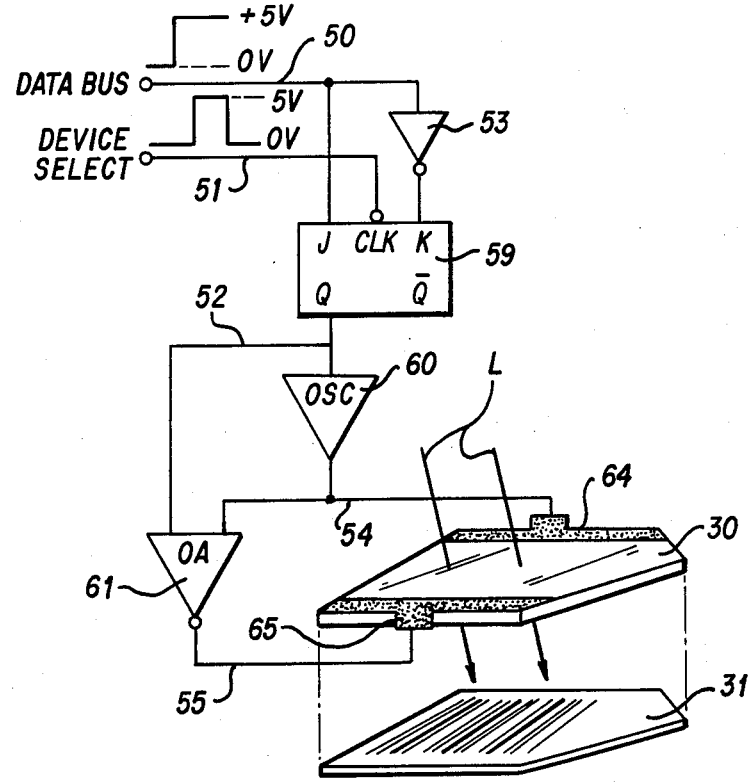

In FIG. 6b, as a result of a device enable strobe 51 and the computer data bus 50 being at plus five volts (1) at the time, the device select register 59 will be clocked into a set condition (Q=1) (Q=+5 volts). The output 52 from the set side is applied to the oscillator 60 and operational amplifier 61, enabling them. The oscillator 60 will start oscillating at 100 HZ, and its output 54 will be applied to one electrode 64 of the shutter 30. The oscillator 60 output will also be applied to the enabled operational amplifier 61 and its resultant output will be shifted one hundred eighty degrees and be of the same amplitude as that of the oscillator 60. The output 55 is applied to the second electrode 65 of the shutter 30. Under these conditions the shutter 30 will go into the transparent mode; light is now permitted to reach the code 31 which is directly underneath the shutter. The code 31 is now visible and can be read. To restore the shutter 30 to the opaque mode, the device enable strobe 51 along with the computer data bus 50 being at zero volts (0), the device select register 59 will be reset and the shutter 30 will go to the opaque mode.

A preferred type of nematic liquid crystal device to be used as the shutter is the plastic dichroics shutter manufactured by Polytronik of Richardson, Tex. The device requires 32 Herz minimum to 200 Herz maximum, + and −5 volts AC.

It is contemplated that the microprocessor 40, the ROM 41 and the RAM 42 and the shutter control and oscillator 45 will be incorporated into the processing unit indicated by the numeral 25.

Figure 7:
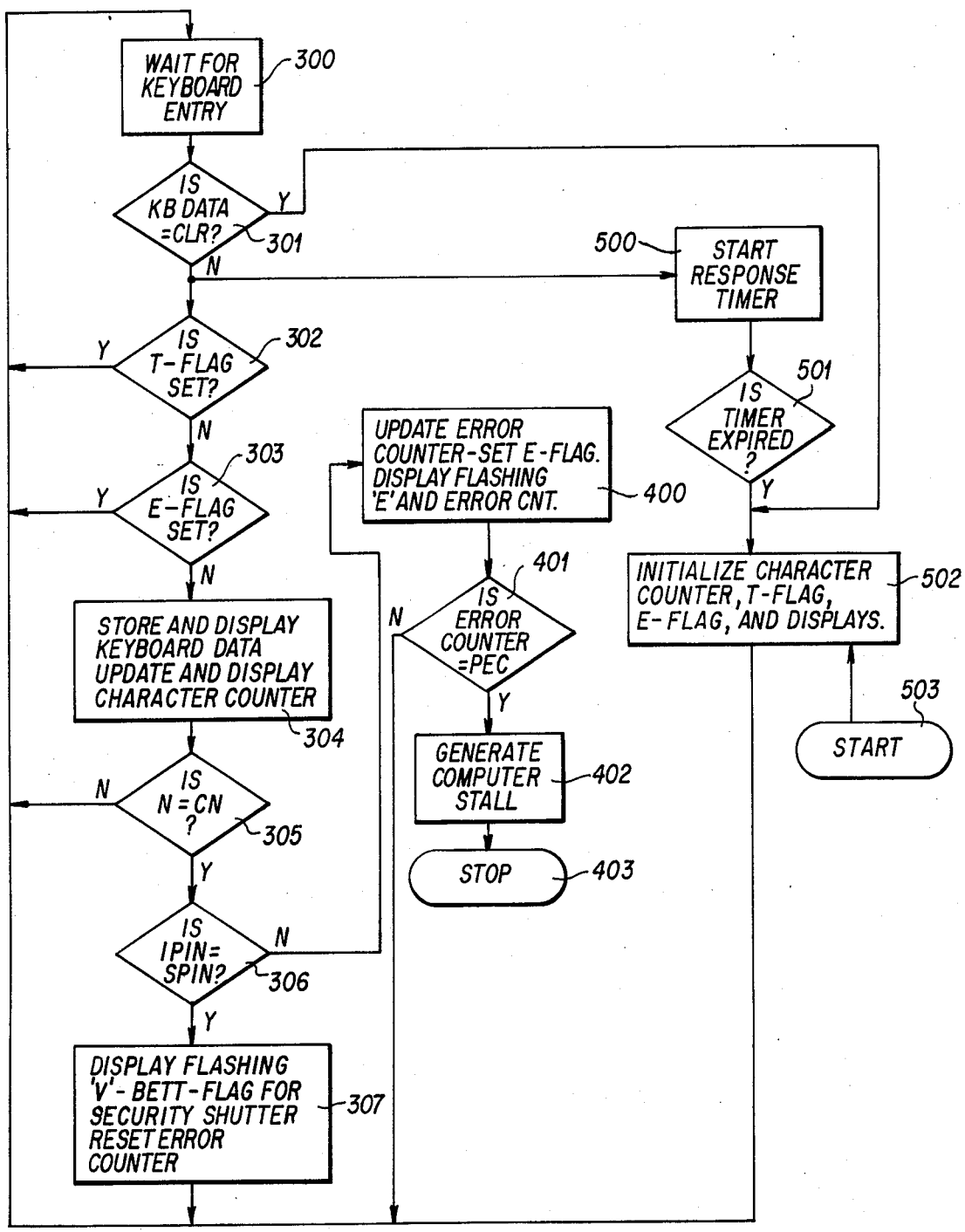
FIG. 7 is a flow chart of the processor.

FIG. 7 diagrammatically portrays the flow transaction process. Thus, after operation of the start switch 503, the program will be waiting for a keyboard entry 300. If the character inputted by the keyboard is other than a "clear" (CLR) character 18, 301 then an operator response timer is started 500. This is to time the card user in case the user fails to complete the sequence of inserting the PIN. After the timer expires 501, the program will initialize 502 and go back to wait for keyboard entry 300.

Assuming the card user does not stop the sequence, the character is stored in RAM 42 and displayed on the LCD 20. Also, the character counter is updated and displayed 304, on LCD 21.

A test is now made to check whether the character counter (CN) equals the character program constant (N) 305. If the two are not equal, then the program will wait for more keyboard entry data 300. When N=CN 305, then a test is made to see if the inputted PIN (IPIN) is equal to the stored PIN (SPIN) 306. If there is a comparison, a flashing "V" will be displayed, the error counter will be reset and the T-flag will be set which will turn on the shutter 30 making the mask 30 transparent.

In the event IPIN is not equal to SPIN 306, then an error counter is updated, an E-flag set, and a flashing "E" is displayed along with the number of times this condition has occurred 400. If the error counter and the program error constant (PEC) are equal 401, then the program will generate a computer stall 402. The processor will stop cycling 503 and the card is no longer useable. In this state, the card cannot be initialized or operated by any means either by user intervention or by the program.

The card can be initialized ordinarily by two methods, one by depressing the clear key 18 or by the expiration of the response timer.

The test to see whether the T-flag 302 and the E-flag 303 are set is to protect against inadvertently processing keyboard data while the card is in the transparent state 302 or error state 303. Only a clear key entry or the expiration of the response time will affect the card while in these conditions.

Figure 4:
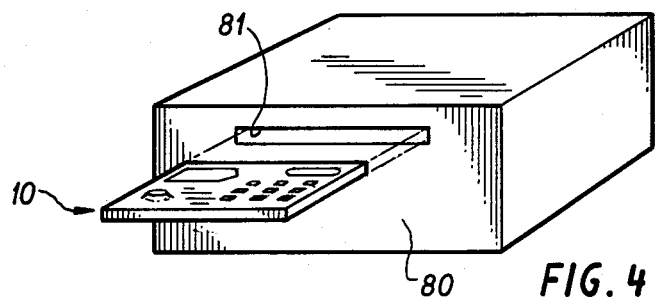
FIG. 4 is a perspective view illustrating the use of the credit with an external device.

FIG. 4 illustrates the use of the card with an external interface unit 80. Thus, the external unit has a slot 81 for receiving the card 10. Interiorly of the unit 80 is a device for machine reading of the code display on the card when it is unmasked. It is contemplated that the card may be read either by a machine or by a sales person in a retail establishment.

In the use of the present device, the customer presents his credit card to a sales person in the establishment in which the transaction is being made. He then inserts his PIN into the keyboard in order that his account number may be visible. The clerk can either note the account number or can place it in an interface unit for machine reading.

If an unauthorized person has the card and does not know the owner's PIN, he is unable to operate the keyboard in order to unmask the account number. Thus, he cannot use the card. In the event that he tries to operate the card without knowing the account number, after a predetermined number of faulty attempts the card will become unuseable. Should the unauthorized person attempt to unmask the code by physical removal of the shield, this will alter the appearance of the card. Should the unauthorized user attempt to apply voltage across the leads to the shield, this could only be done by drilling holes into the card which would be visible. Thus, a clerk at a retail establishment can by mere inspection of a card determine whether it has been tampered with and refuse to permit the use thereof in this event.

Even if the unauthorized person learns the account number, he would still not know the PIN of the authorized holder and therefore would be unable to operate the keyboard of the card in the presence of a retail sales person.

It should also be noted that while a retail sales person may require the holder of the card to operate the keyboard in his presence in order to unmask the code, it is not necessary for the holder of the card to permit the retail sales person to observe which characters of the keyboard are operated. He can do this by covering his hand as he makes the entries on the keyboard. Thus, the holder of the card need not compromise his PIN by operating the card in the presence of a sales person.

I claim:

1. A portable identification device having a code display means and a processing system mounted unitarily, said processing system having identification input means,
   masking means over said code display means, said masking means in a first mode preventing visual reading of said code display means, and in a second mode permitting visual reading of said code display means,
   said processing system having means to cause said masking means to switch from said first mode to said second mode.

2. The invention of claim 1, in which said identification input means includes character input means.

3. The invention of claim 2, said processing system having a stored personal identification number (PIN), and program means for comparing an input series of characters purporting to comprise a PIN to the stored PIN, whereby said processing system means is operative to switch said masking means to said second mode if the input PIN equals the stored PIN.

4. The invention of claim 2, said processing system having a character display means, said processing means functioning to indicate on said character display means each character inputted by said character input means.

5. The invention of claim 2, said processing system having a character counter display means, said processing means functioning to indicate on said character counter display means the number of characters inputted by said character input means.

6. The invention of claim 2, said processing system having input error sensing means and means for disabling said processing system from further operation if the input errors sensed exceed a predetermined standard.

7. The invention of claim 3, said processing system having an input error counter display means, said processing means functioning to indicate on said error counter display means the number of erroneous input series of characters inputted by said character input means.

8. The invention of claim 3, said processing system having means for timing the interval between each input in a series of characters and comparing it to a standard.

9. The invention of claim 2, said processing system having a stored personal identification number (PIN), and program means including:
   (1) means for comparing an input series of characters purporting to comprise a PIN to the stored PIN;
   (2) means for comparing the number of input characters to a standard;
   (3) means for timing the interval between actuation of said keyboard means characters and comparing it to an interval standard;
   (4) means for generating an error indication if the stored PIN is not indentical to the input PIN, or if the interval between keyboard actuations, exceeds the interval standard;
   (5) means for disabling the keyboard means if the number of error indications reaches a predetermined number; and
   (6) means for operating such switch causing means to switch said masking means to said second mode if (1), (2), and (3) above are satisfied.

10. The invention of claim 1, and a terminal device having means for reading said code display means.

11. The invention of claim 1, in which the code display means is a UPC bar code.

12. The invention of claim 1, in which the code display means is a series of characters readable by machine means.

13. The invention of claim 1, in which the masking means is a liquid crystal display.

14. The invention of claim 1, in which the masking means is an encapsulated nematic liquid crystal.

15. The invention of claim 1, in which the masking means is an encapsulated nematic liquid crystal of the type disclosed in the Fergason U.S. Pat. No. 4,435,047.

16. The invention of claim 1, in which the code display means, the processing system, and the masking means are molded together in a thin unitary body.

17. The invention of claim 1, in which the code display means is adhered to the masking means.

* * * * *